(12) United States Patent
Menard et al.

(10) Patent No.: US 7,997,738 B2
(45) Date of Patent: Aug. 16, 2011

(54) COLOR WHEEL FABRICATION

(75) Inventors: Jean Pierre Menard, Arvada, CO (US); Emil Janicek, Westminster, CO (US)

(73) Assignee: Oerlikon Trading AG, Trubbach, Trubbach (CH)

( * ) Notice: Subject to any disclaimer, the term of this patent is extended or adjusted under 35 U.S.C. 154(b) by 550 days.

(21) Appl. No.: 12/234,926

(22) Filed: Sep. 22, 2008

(65) Prior Publication Data

US 2009/0122273 A1 May 14, 2009

Related U.S. Application Data

(60) Provisional application No. 60/975,581, filed on Sep. 27, 2007.

(51) Int. Cl.
*G03B 21/14* (2006.01)
*G02B 5/22* (2006.01)

(52) U.S. Cl. .......................................... 353/84; 359/885

(58) Field of Classification Search .................... 353/84; 359/885–892; 156/244.27, 297, 299, 307.7
See application file for complete search history.

(56) References Cited

U.S. PATENT DOCUMENTS

| 6,024,453 A | 2/2000 | Edlinger et al. |
| 2006/0139574 A1* | 6/2006 | Ralli et al. ................. 353/20 |
| 2006/0237357 A1 | 10/2006 | Jia et al. |

OTHER PUBLICATIONS

International Preliminary Report on Patentability for Appl. No. PCT/EP2008/007877 dated Mar. 30, 2010.

* cited by examiner

*Primary Examiner* — Georgia Epps
*Assistant Examiner* — Ryan Howard
(74) *Attorney, Agent, or Firm* — Pearne & Gordon LLP

(57) ABSTRACT

A pressure sensitive adhesive (PSA) is used to attach a plurality of wedge-shaped glass filter segments on a first side to a hub during the color ring build portion of the color wheel fabrication process. A strong adhesive, such as epoxy, is then used to adhere a second side of the filter segments directly to a turning surface of a motor, completing the color wheel fabrication. The epoxy is cured if necessary. The pressure sensitive adhesive can temporarily align the plurality of color filter segments in an alignment. The adhesive between the filter segments and the turning surface can then permanently bond the color filter segments in the alignment.

21 Claims, 3 Drawing Sheets

COLOR WHEEL FABRICATION

FIELD OF THE INVENTION

This invention relates to color wheel fabrication. More specifically, this invention relates to fabrication of color wheels for projection systems and the like using a simplified adhesive technique.

BACKGROUND OF THE INVENTION

U.S. Pat. No. 6,024,453 is incorporated herein by reference. FIG. 1 (Prior Art) is a block diagram illustrating the invention taught in U.S. Pat. No. 6,024,453. It shows a color wheel 1 having filter segments 12 comprising wedges forming a disk which rotates about axis 10. Motor 2 acts on carrier 11, causing the color wheel to rotate and the filter segments to intercept light beam 6 from light source 5, as monitored by position sensor 3. As the color wheel rotates, the light passes through the filter segments in turn, projecting light of different colors along optical axis 60 in short bursts toward image generation device 7. The light reflects off of an image generation device 7, forming an image transmitted to projection lens 8, and then to a screen 9.

U.S. Pat. No. 6,024,453 describes the environment in which color wheels must operate. The wheel must rotate on the order of thousands of revolutions per minute, and must tolerate high temperatures (on the order of 100° C.) due to its proximity to light source 5. The position of filter segments 12, relative to each other and the axis or rotation, must be carefully maintained in order to balance the color wheel and achieve a long operational life of the device.

The method of attaching the filter segments to the carrier is as follows: the plain color filter segments are bonded on the periphery of the circular carrier via adhesive bonding applied where the glass segment overlaps the carrier. The bonding area is confined to a small ring zone near the center of rotation.

A balancing procedure is performed on the color wheel after fabrication, for example by selectively removing material from the carrier, forming recesses. The recesses may be selectively filled with a material such as adhesive or cement.

The color wheel fabrication procedure taught in this patent works well, but the fabrication process requires many steps. The glass segments are aligned and bonded onto the carrier with a photo-reactive adhesive, which then requires a secondary cure in a heat oven to finish the adhesive cure. The color ring is then attached to a motor with an adhesive such as epoxy, and this assembly is cured again in a heat oven.

Sometimes there are issues with curing the adhesive holding individual filter segments if the segments do not transmit the optimum wavelength for the photo-reactive adhesive. There is also an issue with stress induced by thermal expansion during the oven curing temperature of this adhesive.

A need remains in the art for an improved fabrication technique for color wheels.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

An object of the present invention is to provide an improved fabrication technique for color wheels. This object is accomplished by utilizing a pressure sensitive adhesive (PSA) to attach the wedge-shaped glass filter segments to a hub during the ring build. Then a strong adhesive such as epoxy is used to adhere the filter segments to the color wheel motor turning surface. No photo-reaction or oven curing is required for the PSA filter segment/hub adhesion step. If an oven cure is required for the filter segment/motor adhesion step, it is at a lower temperature than the previously required filter segment/carrier adhesive process.

In accordance with one aspect of the present invention, a method is provided for forming a color wheel assembly is provided that comprises the steps of attaching a plurality of color filter segments on a first side to a pressure sensitive adhesive element, adhering the pressure sensitive adhesive element to a hub balancing washer, and attaching the plurality of color filter segments on a second side through the use of an adhesive to a turning surface of a motor mounted on a motor base.

In accordance with another aspect of the present invention, a method is provided for forming a color wheel assembly comprises the step of forming a color ring by attaching a plurality of color filter segments on a first side to a pressure sensitive adhesive element and attaching the pressure sensitive adhesive element to a hub balancing washer. The pressure sensitive adhesive element temporarily aligns the plurality of color filter segments in an alignment. Another step in the method is to attach the color ring on a second side of the plurality of color filter segments through the use of an adhesive to a turning surface of a motor mounted on a motor base. The adhesive between the color ring and the turning surface permanently bonds the color filter segments in the alignment.

In accordance with another aspect of the present invention, a method is provided for operating a projection system that comprises the step of providing a color ring formed by attaching a plurality of color filter segments on a first side to a pressure sensitive adhesive element and attaching the pressure sensitive adhesive element to a hub balancing washer. The pressure sensitive adhesive element temporarily aligns the plurality of color filter segments in an alignment. Another step in the method is to provide a motor mounted on a motor base, where the motor includes a spindle and the color ring has a center space that receives the spindle. The color ring is attached on a second side of the plurality of color filter segments through the use of an adhesive to permanently bond the color filter segments in the alignment on a turning surface of the motor. Another step in the method is to operate the motor at a speed to rotate the spindle and the color ring together.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF EXAMPLE EMBODIMENTS

Figure 1:
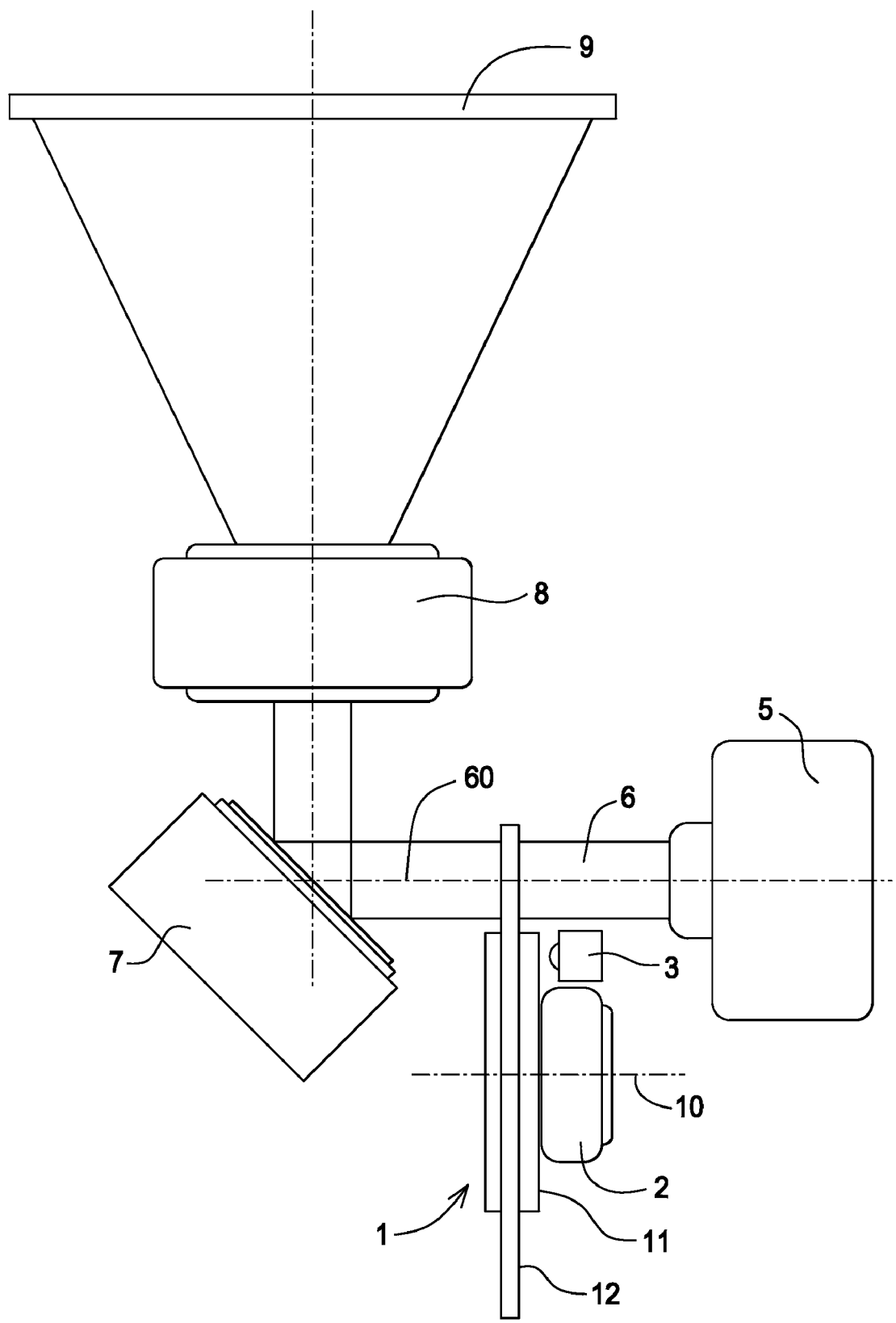
FIG. 1 (Prior Art) shows a color wheel in use in a projection system.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The following table shows the reference numbers and associated elements used in the below-referenced drawings and the description of these drawings.

| Reference Number | Element |
| --- | --- |
| 102 | Hub balancing washer |
| 104 | Pressure sensitive adhesive (PSA) ring |
| 106 | Color Filter segments |
| 108 | Color ring assembly |
| 110 | Motor |
| 112 | Center space formed by filter segments |
| 114 | Motor shaft or spindle |
| 116 | Adhesive (filter segment/motor) |
| 118 | Motor turning surface (can) |
| 120 | Motor base (non-turning) |
| 122 | Color wheel assembly |

Figure 2:
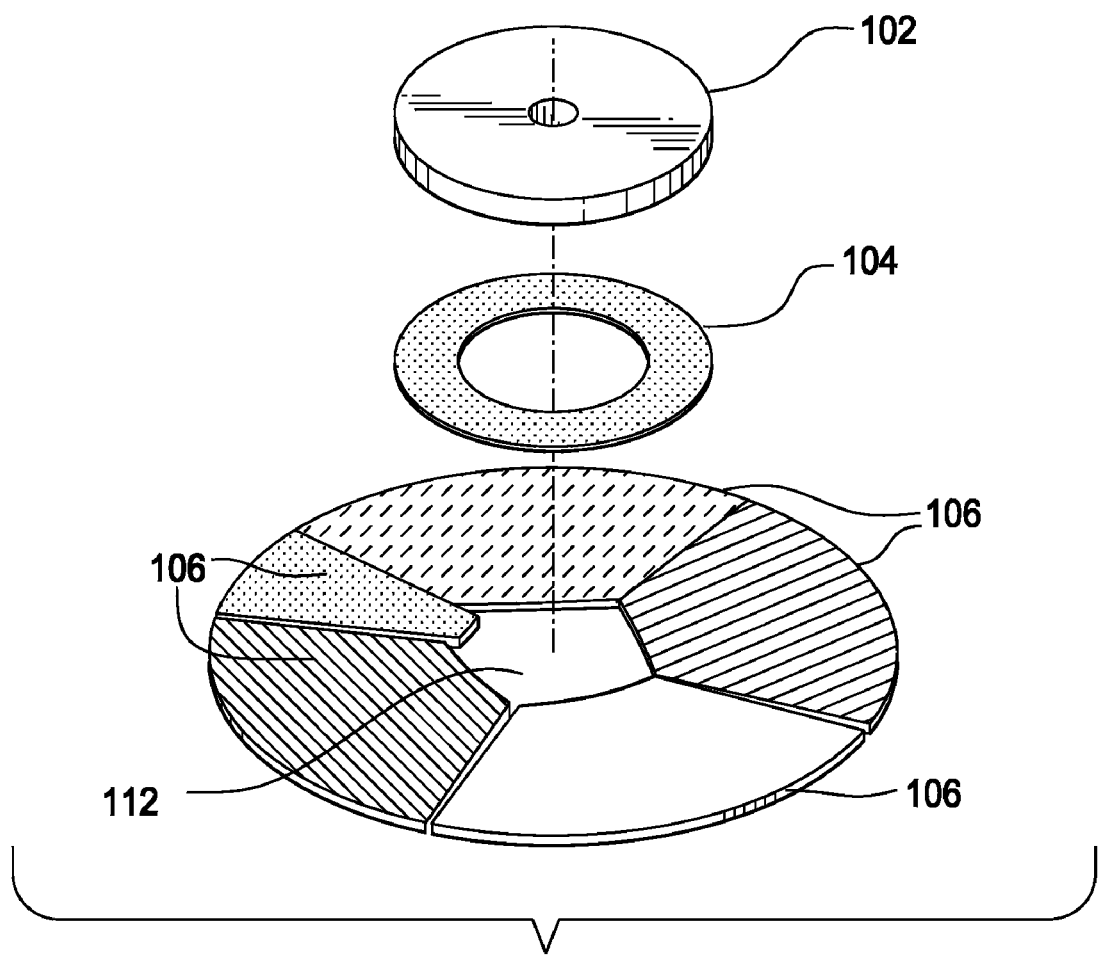
FIG. 2 is a side isometric diagram illustrating a first part of an improved color wheel fabrication technique of the present invention, the ring build.

FIG. 2 is a side isometric diagram illustrating a first part of the improved color wheel fabrication technique of the present invention. The first part of forming the color wheel is building a color ring assembly. The color filter segments 106 are attached to a hub balancing washer 102 using a Pressure Sensitive Adhesive (PSA) element 104, which can be in the shape of a ring. It is appreciated that the pressure sensitive adhesive element can be formed from shapes other than a ring where the shapes have an opening in the center. The hub balancing washer can be configured for balancing the color ring. The color filter segments 106 can be of a variety of shapes and sizes, as shown in FIG. 2. The color filter segments 106 can also be any type of float glass coated in at least one color (for example red, green, blue). There is no oven cure required for the ring build, nor is a photo-reactive cure required.

The plurality of color filter segments can be attached on a first side, such as the top side, to the PSA element. The pressure sensitive adhesive element 104 is used for temporarily fixing the color filter segments 106 to the hub balancing washer 102. The pressure sensitive adhesive element 104 can temporarily align the color filter segments 106 in an alignment, such as the alignment shown in FIG. 2. The alignment corresponds to the orientation of the individual filter segments relative to each other. The alignment of the color filter segments 106 can be used during the rest of the fabrication process. The alignment of the color filter segments 106 can provide a center space 112 that is configured for receiving a spindle of the motor 110.

The PSA material can be semi-solid and can be easily stamped into the preferred ring-shape and applied with no flowing. Therefore, no cleanup or care is required for the pressure sensitive adhesive element. In the preferred embodiment, the PSA element 104 is sized to adhere the color filter segments 106 to the hub balancing washer 102 with no PSA extending outside the periphery of the hub onto the filter segments or into the center space 112 formed by the filter segments. The Pressure Sensitive Adhesive can be selected from a number of commercially available products, such as a PSA product from 3M, double-coated tape, type 9500PC with adhesive 350.

Figure 3:
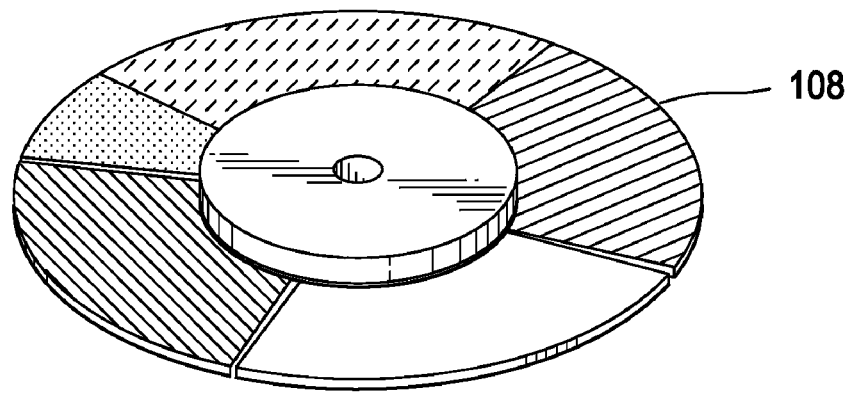
FIG. 3 is an isometric drawing showing a completed color ring.

FIG. 3 is an isometric drawing showing a completed color ring assembly 108, which can be formed from the temporary fixation of the plurality of color filter segments 106, the pressure sensitive adhesive element 104, and the hub balancing washer 102 as described with regards to FIG. 2. The fabrication technique described for FIG. 2 is useful for a number of different color ring/color wheel embodiments. For example, the diameter of the color filter segments 106 can be in a range of 25 mm to 60 mm or more and the color filter segments 106 can be comprised of float glass coated in at least one desired color.

Figure 4:
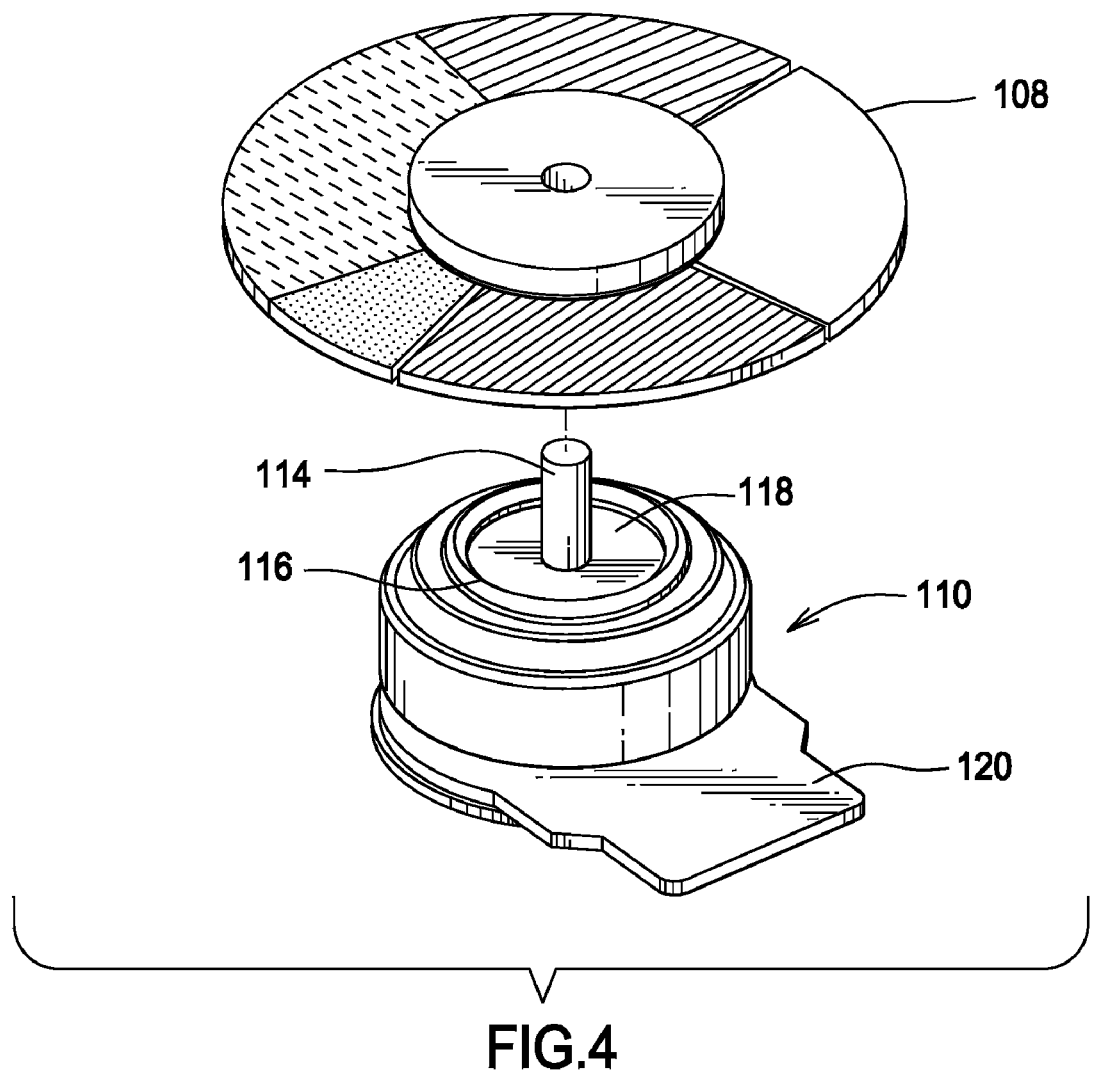
FIG. 4 is a side isometric diagram illustrating a second part of the improved color wheel fabrication technique of the present invention, the color wheel completion.

FIG. 4 is a side isometric diagram illustrating a second part of the improved color wheel fabrication technique of the present invention, the color wheel assembly 122 completion. An epoxy adhesive 116 can be applied between the color ring assembly 108 and a motor 110, shown in FIG. 4. The motor 110 may be a commercially available model, developed for hard drive applications such as the Tokyo Parts PVM9A12T10M1, for example. The motor 110 includes a turning surface 118, such as a can, that is provided about a rotatable motor shaft or spindle 114. In one example method of operating a projection system, the motor 110 can be operated to rotate the spindle 114 and the color ring assembly 108 together. The turning surface 118 rotates in response to activation of the spindle 114. The motor of the projection system can be operated at a spinning speed of between 7200 rpm to 14,400 rpm. The motor 110 and the turning surface 118 can be mounted on a motor base 120. The motor base 120 does not spin, and is used to mount the entire color wheel assembly 122 in place.

The epoxy adhesive 116 can be applied to attach a second side of the plurality of color filter segments 106, which are a part of the color ring assembly 108, to the motor 110. A bead of adhesive 116, enough to coat the desired surface without excess, is applied in the shape of a ring on the turning surface 118 of the motor 110. In other examples, the bead of adhesive can be applied in other shapes on the turning surface 118 of the motor 110. The glass color filter segments 106 of the color ring assembly 108 are pressed onto the adhesive 116. The pressing of the color ring assembly 108 onto the adhesive 116 forms the adhesive 116 into a flat film and adhering the color filter segments 106 directly to the turning surface 118. Once the color ring assembly 108 is attached to the motor 110, a complete color wheel assembly 122 is formed, as shown in FIG. 5.

The epoxy adhesive 116 of FIG. 4 can provide a permanent holding bond for the alignment of the color filter segments 106 during operation of the color wheel assembly 122. The adhesive 116 can be a strong permanent adhesive, such as two-part adhesive epoxy, for example, Hysol 1C or 3M DP460. The adhesive 116 provides a permanent bond that holds the color filter segments 106 in place, such as in the alignment formed during the assembly of the color ring 108. It is also possible that the adhesive 116 provides a permanent bond to hold the color filter segments 106 in a second alignment as the color filter segments 106 can move slightly from the original alignment. In the example two-part epoxy, an oven cure can be required, but a curing temperature of approximately 85° and curing time of 30 to 45 minutes are lower than what was required in previous color wheel fabrication techniques. Choosing a different epoxy adhesive system can also potentially eliminate the need for an oven cure during the attachment of the color ring assembly 108 to the motor 110. Accordingly, the selection of an epoxy adhesive system that does not require an oven cure in either the formation of the color ring assembly 108 or the attachment of the color ring assembly 108 to the motor 110 can thus be provided.

Figure 5:
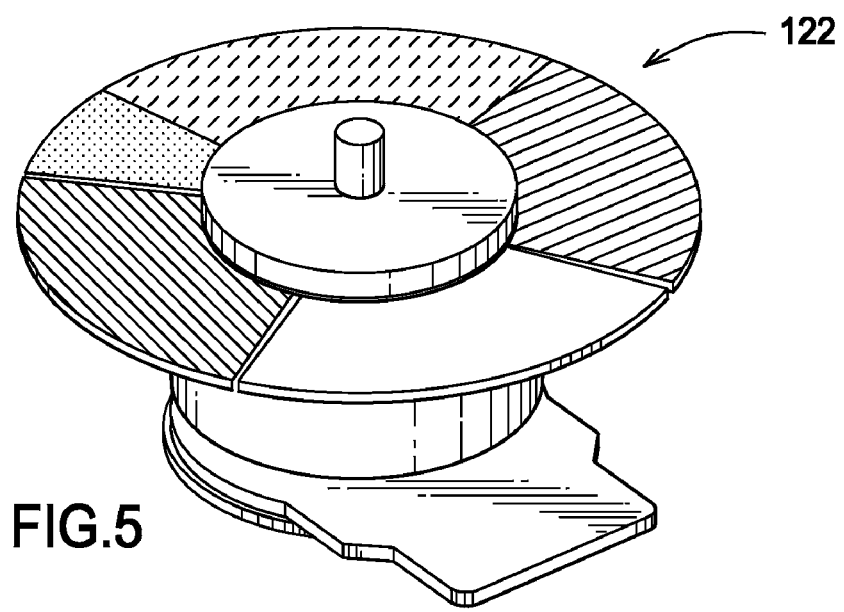
FIG. 5 is a side isometric drawing sowing a completed color wheel assembly.

FIG. 5 illustrates the completed color wheel assembly 122 formed by the assembly shown in FIG. 4. In FIG. 5, the color filter segments 106 of the color ring assembly 108 are now permanently affixed to the turning surface 118 by the adhesive 116. The hub balancing washer 102 remains attached to the color ring assembly 108 via the PSA element 104, and may be used for balancing the color wheel assembly 122 in the conventional manner.

The invention has been described with reference to the examples described above. Modifications and alterations will occur to others upon a reading and understanding of this specification. Examples incorporating one or more aspects of the invention are intended to include all such modifications and alterations insofar as they come within the scope of the appended claims.

What is claimed is:

1. A method of forming a color wheel assembly comprising the steps of:
    attaching a plurality of color filter segments on a first side to a pressure sensitive adhesive element;
    adhering the pressure sensitive adhesive element to a hub balancing washer; and
    attaching the plurality of color filter segments on a second side through the use of an adhesive to a turning surface of a motor mounted on a motor base.

2. The method of claim 1, wherein the pressure sensitive adhesive element is semi-solid.

3. The method of claim 1, wherein the pressure sensitive adhesive element is a double-coated tape.

4. The method of claim 1 wherein the pressure sensitive adhesive element does not require a photo-reaction or oven curing to attach the plurality of color filter segments to the hub balancing washer.

5. The method of claim 1, wherein each filter segment is comprised of float glass coated in at least one color.

6. The method of claim 1, wherein the adhesive is a two-part adhesive.

7. The method of claim 1, wherein the adhesive is applied in the shape of a ring to the turning surface.

8. The method of claim 1, further comprising the step of curing the adhesive at 85° for a time between 30 to 45 minutes.

9. A method of forming a color wheel assembly comprising the steps of:
    forming a color ring by attaching a plurality of color filter segments on a first side to a pressure sensitive adhesive element and attaching the pressure sensitive adhesive element to a hub balancing washer;
    wherein the pressure sensitive adhesive element temporarily aligns the plurality of color filter segments in an alignment;
    attaching the color ring on a second side of the plurality of color filter segments through the use of an adhesive to a turning surface of a motor mounted on a motor base; and
    wherein the adhesive between the color ring and the turning surface permanently bonds the color filter segments in the alignment.

10. The method of claim 9, wherein the pressure sensitive adhesive element is semi-solid.

11. The method of claim 9, wherein the pressure sensitive adhesive element is a double-coated tape.

12. The method of claim 9, wherein the pressure sensitive adhesive element does not require a photo-reaction or oven curing.

13. The method of claim 9, wherein each filter segment is comprised of float glass coated in at least one color.

14. The method of claim 9, wherein the adhesive is a two-part adhesive.

15. The method of claim 9, wherein the adhesive is applied in the shape of a ring to the turning surface.

16. The method of claim 9, further comprising the step of curing the adhesive at 85° for a time between 30 to 45 minutes.

17. The method of claim 9, wherein the diameter of the alignment of the color filter segments is in a range of 25 mm to 60 mm.

18. A method of operating a projection system comprising the steps of:
    providing a color ring formed by attaching a plurality of color filter segments on a first side to a pressure sensitive adhesive element, and attaching the pressure sensitive adhesive element to a hub balancing washer, wherein the pressure sensitive adhesive element temporarily aligns the plurality of color filter segments in an alignment;
    providing a motor mounted on a motor base, wherein the motor includes a spindle and the color ring has a center space that receives the spindle; wherein the color ring is attached on a second side of the plurality of color filter segments through the use of an adhesive to permanently bond the color filter segments in the alignment on a turning surface of the motor; and
    operating the motor at a speed to rotate the spindle and the color ring together.

19. The method of claim 18, wherein the motor is operated at a speed between 7200 rpm to 14,400 rpm.

20. The method of claim 18, wherein each filter segment is comprised of float glass coated in at least one color.

21. The method of claim 18, wherein the adhesive is applied in the shape of a ring to the turning surface.

* * * * *